March 19, 1968     D. SCARAMUCCI     3,373,967

BETWEEN-FLANGE BALL VALVE

Filed April 12, 1965     3 Sheets-Sheet 1

INVENTOR.
DOMER SCARAMUCCI
BY
Dunlap & Laney
ATTORNEYS

March 19, 1968

D. SCARAMUCCI 3,373,967

BETWEEN-FLANGE BALL VALVE

Filed April 12, 1965

INVENTOR.
DOMER SCARAMUCCI

BY
Dunlap Laney
ATTORNEYS

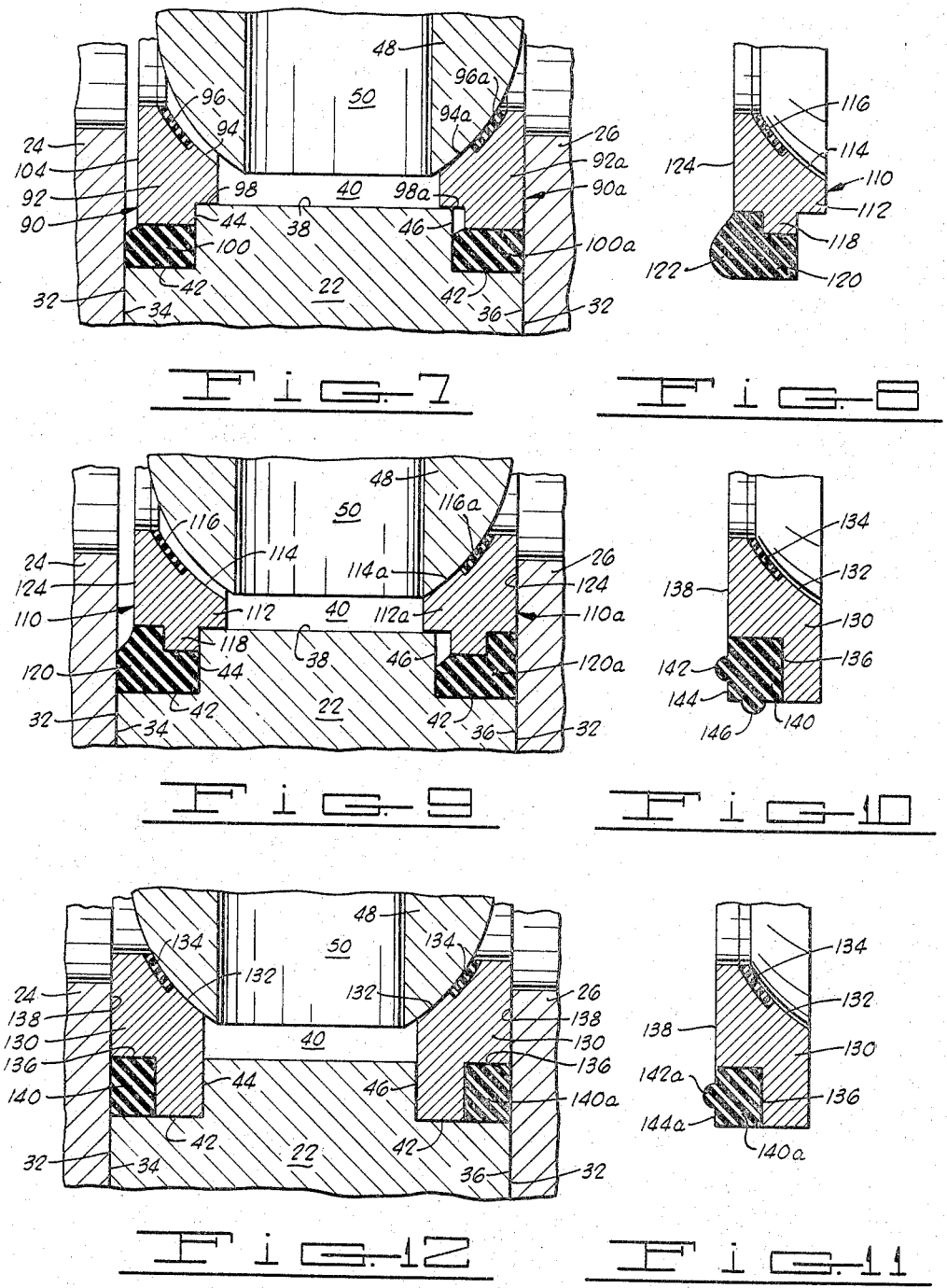

United States Patent Office 3,373,967
Patented Mar. 19, 1968

3,373,967
BETWEEN-FLANGE BALL VALVE
Domer Scaramucci, 3245 S. Hattie,
Oklahoma City, Okla. 73129
Filed Apr. 12, 1965, Ser. No. 447,282
17 Claims. (Cl. 251—148)

ABSTRACT OF THE DISCLOSURE

A ball valve including a tubular body having counterbored upstream and downstream end faces. A ball is positioned in the tubular body between a pair of seals which each include a high strength seating ring having a portion positioned in one of the counterbores and axially slidable in such counterbore parallel to the direction of fluid flow. Each seating ring has a frusto-spherical front face configured to sealingly engage the ball and an outer face facing toward the nearest end face of the valve body. An elastic material sealing ring is adhered to each seating ring and is dimensioned to bear resiliently against the wall of the respective counterbore receiving a portion of the seating ring to which it is bonded, and is also dimensioned to extend beyond the nearest end face of the valve body in its relaxed condition, so that assembly of the valve between two flanged members contacting the end faces places the sealing ring in compression and in sealing engagement with said flanged members.

---

This invention relates generally to improvements in valves, and more particularly, but not by way of limitation, to a ball valve adapted to be installed between standard pipe flanges.

As it is well known in the art, ball valves have historically been provided with connectors of some type on the opposite ends of the valve body for connecting the body to adjacent sections of a pipe line. Many ball valves in the past have been provided with internally threaded inlets and outlets to be screw-connected with joints of pipe. Other types of ball valves in the past have been provided with flanges formed integrally on the opposite ends of the valve body for connection with mating pipe flanges. In either case, the provision of the connectors requires an appreciable amount of machine work in not only forming the connectors but also in forming the valve chamber, and such valves require the use of an unduly large amount of metal.

The present invention contemplates a novel ball valve construction wherein the valve body is simply provided with flat end faces and is bolted between a pair of standard pipe flanges in order to connect the valve in a pipe line. The valve chamber for the valve is provided by merely forming a bore through the valve body and counterbores in the opposite ends of the body concentrically around the bore extending through the body. High strength material seating rings are inserted in the counterbores at the opposite ends of the body to mate with the adjacent surfaces of a ball positioned in the valve chamber. An elastic material sealing ring is bonded to each of the seating rings and is shaped to prevent the leakage of fluid between the adjacent pipe flange and the adjacent end of the valve body, as well as to prevent the leakage of fluid around the outer periphery of the respective seating ring. In a preferred construction, the distance between the outer faces of the seating rings is less than the length of the valve body and the seating rings are positioned to slide limited distances in the respective body counterbores, such that when the valve is closed, the ball will be moved away from the upstream seating ring, but will remain in contact with the downstream seating ring, whereby the valve will be provided with a downstream seal. In an alternate construction, the seating rings are sized to retain the ball centered in the valve chamber and form both upstream and downstream seals when the valve is closed. In either form of the valve, the seating rings are positioned so as not to be distorted when the pipe flanges are bolted against the opposite ends of the valve body.

An object of the invention is to provide a ball valve requiring a minimum of machine work in the construction thereof.

Another object of this invention is to provide a ball valve requiring a minimum of metal for its construction.

A further object of this invention is to provide a ball valve body which may be simply bolted between a pair of standard pipe flanges to provide a complete valve assembly.

A further object of this invention is to provide a ball valve for use between a pair of standard pipe flanges wherein the valve seats will not be distorted by the action of clamping the pipe flanges against the opposite ends of the valve body.

Another object of this invention is to provide a ball valve for use between a pair of standard pipe flanges wherein the flanges will be effectively sealed to the opposite ends of the body by the same seals which are used to prevent leakage of fluid around the valve seats.

Another object of this invention is to provide a ball valve assembly wherein the pressure in the valve body will not build up to an excessive limit.

A still further object of this invention is to provide an economically constructed ball valve assembly which will have a long service life, and which may be easily repaired.

Other objects and advantages of the invention will be evident from the following detailed description when read in conjunction with the accompanying drawings which illustrate the invention.

In the drawings:

FIG. 7 is a view similar to FIG. 5 showing the use of the seating ring of FIG. 6.

FIG. 8 is an enlarged typical cross-sectional view of another modified seating ring assembly.

FIG. 9 is another view similar to FIG. 7 illustrating the operation of the seating ring assembly of FIG. 8 when the valve is in a closed position.

FIGS. 10 and 11 are enlarged typical cross-sectional views of other seating ring assemblies which may be used.

FIG. 12 is another view similar to FIG. 7 showing the use of the seating ring assemblies of either FIG. 10 or FIG. 11.

Figures 1, 3, 4:
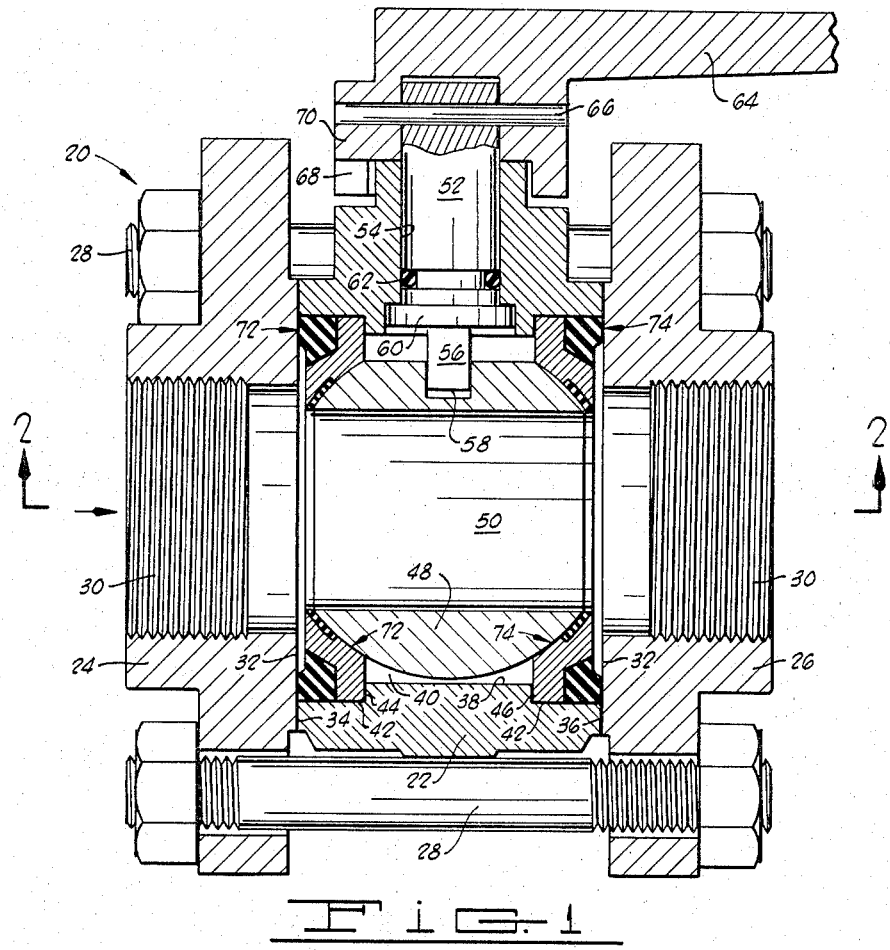
FIG. 1 is a vertical cross-sectional view through a ball valve assembly constructed in accordance with this invention.
FIG. 3 is an enlarged typical cross-sectional view of one of the seating ring assemblies used in the valve of FIGS. 1 and 2.
FIG. 4 is an enlarged cross-sectional view of the lower portion of the valve assembly of FIG. 1 to more clearly illustrate details of construction.

Referring to the drawings in detail, and particularly FIG. 1, reference character 20 generally designates a ball valve assembly constructed in accordance with this invention and basically comprising a valve body 22 clamped between a pair of standard pipe flanges 24 and 26 by a plurality of bolts 28. The bolts 28 are arranged in circumferentially spaced relation around the body 22 and may be received in grooves (not shown) formed in the outer periphery of the valve body to facilitate the alignment of the flanges 24 and 26 with the valve body, if desired. Each of the pipe flanges 24 and 26 has a partially threaded bore 30 therethrough, and the inner face 32 of each of the pipe flanges is normally machined flat. The upstream end face 34 and the downstream end face 36 of the body 22 are also preferably machined flat to contact the faces 32 of the pipe flanges 24 and 26, such that when the bolts 28 are connected as shown in FIG. 1, a rigid valve assembly is provided.

A bore 38 is formed through the valve body 22 between the end faces 34 and 36 to provide a valve chamber 40 in the valve. It should also be noted that the diameter of the bore 38 is larger than the bores 30 through the flanges 24 and 26. A counterbore 42 is formed in each end face of the body 22 concentrically around the bore 38 to form a shoulder 44 facing upstream from the valve chamber 40 and a shoulder 46 facing downstream from the valve chamber.

Figure 2:
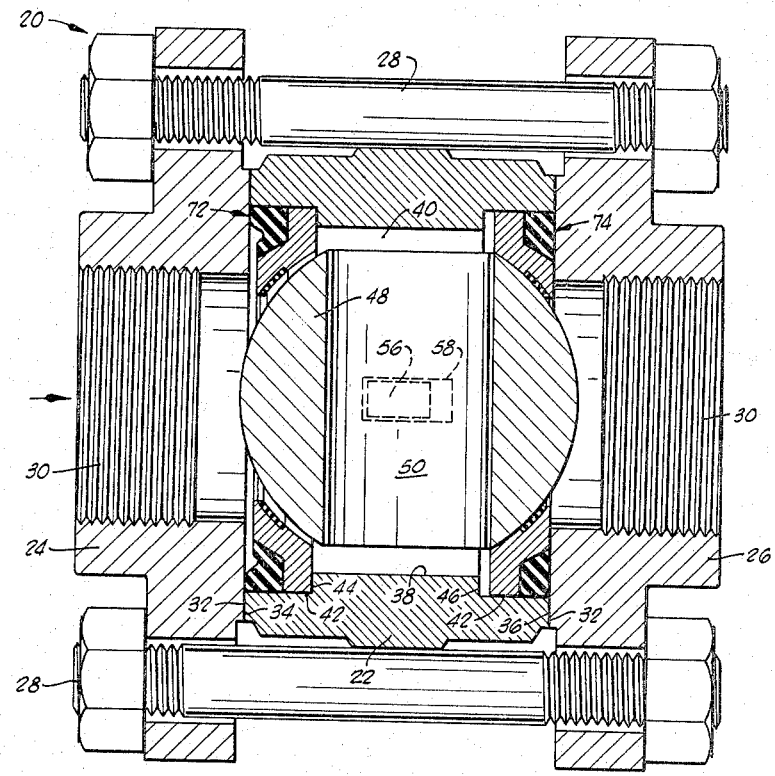
FIG. 2 is a horizontal sectional view through the valve assembly as taken along lines 2—2 of FIG. 1.

A valve ball 48 is positioned in the valve chamber 40 and is provided with the usual port 50 therethrough to provide flow through the valve when the ball 48 is in the position shown in FIG. 1. A valve stem 52 extends through a mating aperture 54 in the top of the valve body 22 for controlling the turning movement of the ball 48. The inner end 56 of the valve stem 52 is preferably rectangular in cross-section and is received in an elongated slot 58 in the top of the ball 48. As shown in FIG. 2, the slot 58 in the ball 48 is longer than the transverse length of the inner end 56 of the valve stem, such that the ball 48 is free to move axially in the valve chamber 40 when the valve is closed as shown in FIG. 2. A flange 60 (FIG. 1) is formed around the valve stem 52 inside of the body 22 to contact the walls of the body and prevent removal of the stem during operation of the valve. Also, a suitable sealing ring 62, such as an O-ring, is positioned in a mating groove around the valve stem 52 to provide a seal of the valve stem with the walls of the aperture 54 and prevent the leakage of fluid from the valve chamber 40 around the valve stem. A handle 64 is secured to the outer end of the valve stem 52 by a suitable pin or the like 66 in order to manually control the opening and closing movements of the valve. Also, a lug 68 is formed on the lower end of the handle hub 70 in a position to mate with a corresponding lug (not shown) formed on the valve body 22 to limit the turning movement of the ball 48, as is conventional in ball valve constructions.

An upstream seating ring assembly 72 is positioned in the counterbore 42 adjacent the upstream end 34 of the valve body 22, and a downstream seating ring assembly 74 is positioned in the counterbore 42 at the downstream end 36 of the valve body. The seating ring assemblies 72 and 74 are constructed in the same manner, so the detailed description of one of the seating ring assemblies will suffice. As shown in FIG. 3, the seating ring assembly 72 comprises a high strength material seating ring 76 formed of metal or the like and having a front face 78 shaped to slidingly mate with the outer surface of the ball 48. A seal 80 is bonded in a mating groove in the front face 78 and is preferably formed of a relatively soft elastic material to provide an effective seal with the outer surface of the ball 48. An annular groove 82 is formed in the outer end face 84 of the seating ring 76 to receive an elastic material sealing ring 86. The sealing ring 86 is bonded to the walls of the groove 82 and extends radially outward beyond the outer periphery of the seating ring 76 in order to engage and to be distorted by the walls of the respective valve body counterbore 42 when the seating ring assembly is installed in the valve assembly. It will also be observed in FIG. 3 that in its relaxed condition, the sealing ring 86 extends an appreciable distance outwardly from the outer end face 84 of the seating ring 76 to be engaged and distorted by the flange 24 when the valve is assembled as shown in FIGS. 1 and 4. An annular groove 87 is formed in the outer end face of the sealing ring 86.

As most clearly shown in FIG. 4, the axial thickness of the sealing ring 86, plus the axial thickness of the adjacent portion of the seating ring 76, is greater than the depth of the respective counterbore 42, whereby the outer face of the sealing ring 86 will be effectively engaged by the flange 24 when the seating ring 76 is seated against the shoulder 44. Prior to the bolting of the flange 24 against the upstream end face 34 of the valve body 22, that is when the seating ring 76 is seated against the shoulder 44 and the sealing ring 86 is in a relaxed condition, the sealing ring will protrude beyond the upstream end face 34 of the valve body. Thus, when the flange 24 is bolted in the position shown in FIG. 4, the flange distorts the sealing ring 86 to such a degree that the sealing ring will tightly engage both the flange 24 and the walls of the counterbore 42. It may also be noted in FIG. 4 that the axial thickness of the seating ring 76 is less than the depth of the respective counterbore 42, such that the outer end face 84 of the seating ring will be spaced from the adjacent flange 24 when the flange 24 is bolted against the end face 34 of the valve body. As indicated above, the downstream seating ring assembly 74 is constructed in the same manner as the upstream seating ring assembly 72. Therefore, the portions of the downstream seating ring assembly 74 have been given the same reference numbers as the corresponding portions of the upstream seating ring assembly, with the addition of the subscript a.

When the valve 20 is open as shown in FIG. 1 and FIG. 4, the ball 48 will be centered in the valve chamber 40 and the seating ring assemblies 72 and 74 will be seated against the respective shoulders 44 and 46, with both of the seating ring assemblies being in sliding contact with the outer surface of the ball 48. In this position of the valve, the upstream pressure tending to flow outwardly between the flange 24 and the upstream end face 34 of the valve body 22 is effectively trapped by the upstream sealing ring 86. In fact, the fluid under pressure at the upstream end of the valve will enter the groove 87 and further distort the upstream sealing ring 86 against the face 32 of the flange 24 and against the walls of the respective counterbore 42 to actually enhance the seal provided between the flange 24 and the body 22. The downstream sealing ring 86a operates in the same manner to effectively prevent the leakage of fluid between the flange 26 and the downstream end face 36 of the body 22.

Figures 5, 6:
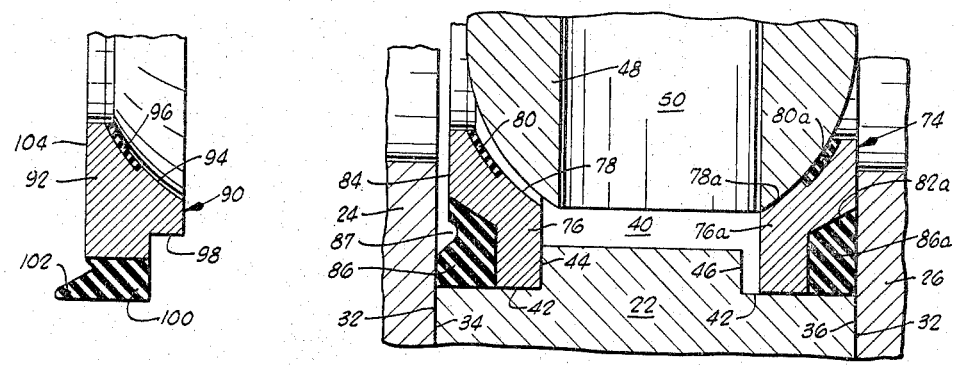
FIG. 5 is a view similar to FIG. 4 showing the valve in a closed position.
FIG. 6 is an enlarged typical cross-sectional view of a modified seating ring assembly.

When the valve 20 is closed and the ball 48 is loosely connected to the stem 52 as shown in FIG. 2, the upstream pressure will force the ball 48 downstream as shown in both FIGS. 2 and 5. The downstream seating ring 76a will thus be moved downstream into contact with the flange 26 and the downstream sealing ring 86a will be further distorted in the groove 82a of the downstream seating ring. In this connection it should be noted that the annular groove 87a in the outer face of the downstream sealing ring 86a is sufficiently large to provide a space for the distortion of the downstream sealing ring, such that the downstream sealing ring may be wholly confined within the groove 86a as shown in FIG. 5 and no portion of the sealing ring 86a will tend to be pinched off between the seating ring 76a and the adjacent face 32 of the flange 26. It should further be noted that with the position of the ball shown in FIG. 5, the seal 80a in the downstream seating ring assembly 74 will remain in contact with the outer surface of the ball and effectively provide a downstream seal for the valve.

When the ball 48 is moved downstream, the upstream seating ring assembly 72 is restrained by the shoulder 44 and can not follow the downstream movement of the ball. Therefore, the ball 48 will move away from the front face 78 of the upstream seating ring assembly 72 and provide a space between the seating ring 76 and the ball. Thus, when the valve is constructed in this manner, the valve is not provided with an upstream seal, but is provided with an effective downstream seal as previously indicated. It should be noted, however, that the upstream sealing ring 86 is retained in contact with the flange 24 when the valve 20 is closed to effectively prevent the leakage of fluid between the flange 24 and the upstream end face 34 of the valve body 22. It will be understood by those skilled in the art that if the ball 48 is rigidly secured to the valve stem 52 along a fixed vertical axis in the valve body 22, the upstream seating ring assembly 72 will remain in contact with the ball when the ball is closed to provide an effective upstream seal.

A modified seating ring assembly 90 is illustrated in FIG. 6 and comprises a seating ring 92 of high strength material having a front face 94 shaped to mate with the outer surface of the ball 48. An elastic material seal 96 is bonded in a mating groove in the front face 94 to provide a seal with the outer surface of the ball. In this embodiment, a groove 98 is formed in the inner face of the seating ring 92 coterminous with the outer periphery of the ring. The outer diameter of the seating ring 92 at the groove 98 is substantially equal to the diameter of the bore 38 through the body 22 to slidingly fit in the bore 38 as is shown in FIG. 7.

An elastic material sealing ring 100 (FIG. 6) is bonded around the outer periphery of the seating ring 92 outwardly of the groove 98 and has an outer diameter slightly larger than the diameter of the respective body counterbore 42 in the relaxed condition of the sealing ring. It will also be noted in FIG. 6 that the outer end face 102 of the sealing ring 100 extends an appreciable distance beyond the outer end face 104 of the seating ring 92. In fact, in the relaxed condition of the sealing ring 100, the axial thickness of the sealing ring is greater than the depth of the respective counterbore 42, such that the sealing ring will be appreciably distorted against the walls of the counterbore 42 and the adjacent face of the respective pipe flange when the valve is assembled as illustrated in FIG. 7. The seating ring assembly 90 illustrated in FIG. 6 is shown in the position of an upstream seating ring assembly when the valve 20 is viewed as in FIGS. 1 and 2. The downstream seating ring assembly 90a as shown in FIG. 7 is the same in construction as the upstream seating ring assembly 90 and is therefore given the same reference numbers with the subscript *a*.

When the seating ring assemblies 90 and 90a are installed in the valve 20 and the valve is open, the ball 48 will be centered in the valve chamber 40 and both of the seating ring assemblies will be positioned as shown by the position of the seating ring assembly 90 in FIG. 7. It will there be noted that the bottom of the groove 98 is in contact with the upstream body shoulder 44 and the outer end face 104 of the respective seating ring 92 is spaced from the adjacent flange 24. Any fluid tending to leak between the flange 24 and the valve body 22 will be effectively trapped by the sealing ring 100. Similar conditions will prevail at the downstream end of the valve where the sealing ring 100a will effectively prevent the leakage of fluid between the flange 26 and the downstream end 36 of the valve body.

When the ball 48 is closed as shown in FIG. 7, and when the ball is loosely connected to the valve stem, the ball 48 will be moved downstream until the downstream seating ring 92a contacts the flange 26. In this position of the seating ring 92a, it will be observed that the sealing ring 100a is still effectively trapped in the respective counterbore 42 to effectively prevent the leakage of fluid between the flange 26 and the downstream end 36 of the valve body. Furthermore, the downstream sealing ring 100a is in sealing engagement with the walls of the counterbore 42 to prevent the leakage of fluid from the valve chamber 40 around the outer periphery of the seating ring 92a. The seal 96a on the downstream seating ring 92a will be in sealing engagement with the ball 48 to provide an effective downstream seal for the valve. On the other hand, the upstream seating ring 92 will be restrained by the upstream body shoulder 44 and will not be able to follow the downstream movement of the valve ball 48. Thus, the ball 48 moves away from the front face 94 of the upstream seating assembly with the result that no upstream seal is provided for the valve. However, the upstream sealing ring 100 will still function to prevent the leakage of fluid between the flange 24 and the upstream end face 34 of the valve body, as well as prevent the leakage of fluid from the valve chamber 40 around the outer periphery of the sealing ring 92.

Another modified seating ring assembly 110 is illustrated in FIG. 8. The seating ring assembly 110 comprises a seating ring 112 of high strength material having a front face 114 shaped to slidingly mate with the outer surface of the ball 48. An elastic material seal 116 is bonded in a mating groove in the front face 114 to seal with the surface of the ball 48. A circumferential flange 118 is formed around the medial portion of the outer periphery of the seating ring 112 and is of a size to extend into the respective body counterbore 42 as shown in FIG. 9. An elastic material sealing ring 120 (FIG. 8) is bonded to the outer periphery of the flange 118, to the outer face of the flange 118 and to the outer periphery of the seating ring 112 outwardly of the flange 118. As in the previous embodiments, the outer end portion 122 of the sealing ring 120 protrudes as substantial distance outwardly of the outer end face 124 of the seating ring 112 to be engaged by the upstream flange 24 when the valve is assembled.

The seating ring assembly 110 is shown installed as an upstream seating ring assembly in FIG. 9. The downstream seating ring assembly 110a is constructed in the same manner as the seating ring assembly 110, thus the corresponding portions of structure of the seating ring assembly 110a are given the same reference numbers as in the upstream seating ring assembly, with the subscript *a* added. The seating ring assemblies 110 and 110a operate in the same manner as the seating ring assemblies 90 and 90a previously described in connection with FIG. 7. In this construction, however, the outer peripheries of the seating rings 112 and 112a slidingly fit in the bore 38 of the valve body 22 to retain the seating ring assemblies concentric with respect to the ball 48. When the ball 48 is in a closed position as shown in FIG. 9 the circumferential flange 118 of the upstream seating ring 112 engages the shoulder 44 and limits the downstream movement of the upstream seating ring. The sealing rings 120 and 120a are sufficiently distorted by the flanges 24 and 26 to seal with the walls of the respective counterbores 42 and prevent leakage from the valve in the same manner as previously described.

Two other modifications of seating rings are illustrated in FIGS. 10 and 11. Each of these constructions utilizes a seating ring 130 of high strength material having a front face 132 shaped to slidingly mate with the valve ball. An elastic material seal 134 is bonded in a mating groove in the front face 132 to seal with the outer surface of the valve ball. A groove 136 is formed in the outer end face 138 of the seating ring 130 and extends to the outer periphery of the seating ring to receive an elastic material sealing ring 140 (FIG. 10) or 140a (FIG. 11). The sealing ring 140 or 140a is bonded to the walls of the respective seating ring groove 136.

In the construction shown in FIG. 10, the sealing ring 140 has an annular bead 142 formed on the outer end face 144 thereof which protrudes beyond the outer end face 138 of the respective seating ring 130, as well as an annular bead 146 formed on the outer periphery thereof protruding beyond the outer periphery of the seating ring 130. In the construction shown in FIG. 11, the sealing ring 140a is provided only with the annular bead 142a on the outer end face 144 thereof protruding beyond the outer end face 138 of the respective seating ring 130. In this FIG. 11 construction, the outer periphery of the sealing ring 140a may protrude beyond the outer periphery of the seating ring 130 as will be described in connection with FIG. 12.

Merely for purposes of illustration, I have shown in FIG. 12 the FIG. 10 seating ring assembly construction as the upstream seating ring assembly and the FIG. 11 construction as the downstream seating ring assembly, although these constructions may be interchanged at will. As will be observed in FIG. 12, the outer diameter of each seating ring 130 is of a size to provide a sliding fit of the respective seating ring in the respective valve body counterbore 42, and the axial thickness of each seating ring 130 is substantially equal to, but not greater than, the depth of the respective body counterbore 42. Thus, when the flanges 24 and 26 are bolted against the opposite ends of the valve body 22, the flanges 24 and 26 may contact the respective seating rings 130 but will not distort the seating rings.

In both the FIG. 10 and the FIG. 11 seating ring assembly construction, the respective annular bead 142 or 142a on the respective sealing ring is contacted and distorted by the respective flange 24 or 26 to provide a positive seal between the respective sealing ring and the respective flange. In the FIG. 10 construction, the annular bead 146 is distorted by the walls of the respective counterbore 42 to further assure a seal around the outer periphery of the respective seating ring 130. In the FIG. 11 construction, the distortion of the bead 142a will normally provide movement of the sealing ring material into tight engagement with the walls of the respective counterbore 42 when the respective flange is bolted against the respective end of the valve body. However, as previously noted, the outer periphery of the sealing ring 140a may extend outwardly of the outer periphery of the respective seating ring 130 to further assure that the sealing ring will sealingly engage the walls of the respective counterbore 42 when the seating ring assembly is installed in the valve.

In the seating ring assembly constructions shown in FIG. 12, the seating rings 130 are sized to slidingly mate with the ball 48 when the valve is assembled; the seating rings are in engagement with the respective body shoulders 44 and 46, and the ball 48 is centered in the valve chamber 40. When the ball 48 is moved to a closed position as illustrated in FIG. 12, the ball will remain centered in the valve chamber, since neither seating ring 130 is free to move axially with respect to the valve chamber. Thus, both of the seating ring seals 134 will remain in sealing engagement with the outer surface of the ball 48 to provide both upstream and downstream seals for the valve. It may also be pointed out that in this construction, the ball 48 may be secured to the valve body 22 in such a manner so as not to be free to move axially in the chamber 40. When the ball 48 is closed, the sealing rings 140 and/or 140a are effectively trapped in the respective seating ring grooves 136 against both the respective flanges 24 or 26 and the walls of the respective counterbore 42 to prevent leakage from either the chamber 40 or between the flanges and the opposite ends of the valve body.

From the foregoing it will be apparent that the present invention provides a novel ball valve construction which will require the minimum of machine work on the valve body and the valve body will require a minimum of metal in its construction. The valve chamber is formed by merely providing a bore through the valve body and counterbores at the opposite ends of the valve body. In assembling the valve, the valve body is simply clamped between standard pipe flanges to provide a rigid valve construction which may be easily repaired. However, the valve seats are not distorted by the action of bolting the pipe flanges to the opposite ends of the body, even though the seats are effectively sealed in the valve chamber and the flanges are effectively sealed to the opposite ends of the valve body. It will also be apparent that the present valve may be constructed to provide only a downstream seal or both upstream and downstream seals when the valve is closed.

Changes may be made in the combination and arrangement of parts or elements as heretofore set forth in the specification and shown in the drawings without departing from the spirit and scope of the invention as defined in the following claims.

What is claimed is:

1. A ball valve for use between a pair of flanges comprising:
  a body having an upstream end face and a downstream end face for contacting said flanges when the valve is assembled between the flanges, and having a bore therethrough between said end faces forming a valve chamber in the body, said body also having a counterbore in each of said end faces concentric with said bore forming outwardly facing upstream and downstream shoulders;
  a ball positioned in the valve chamber and having a port therethrough;
  means for turning the ball between open and closed positions;
  a pair of seating rings of high strength material each having a portion positioned in one of said counterbores, having a frusto-spherical front face shaped to slidingly mate with the outer surface of the ball, and having an outer face, the distance between said outer faces of the seating rings being not greater than the distance between said upstream and downstream end faces when said seating rings are in sliding contact with said ball, said portion of said seating rings positioned in the respective counterbores occupying less than the total axial width of the respective counterbore whereby said seating rings may slide in said counterbores in an axial direction parallel to the direction of fluid flow through the valve, and the one of said seating rings positioned in the counterbore forming said upstream shoulder bearing against said upstream shoulder at all times during operation of the valve; and
  an elastic material sealing ring adhered to each seating ring having an outer diameter, in the relaxed condition thereof, greater than the diameter of the respective counterbore and positioned to be compressed against the walls of the respective counterbore when the valve is assembled, said sealing rings, in their relaxed condition, each being extended outwardly of said upstream and downstream end faces when the seating rings are in sliding contact with the ball to be deformed by said flanges when the valve is assembled, whereby said sealing rings seal against said flanges and the walls of said counterbores, said sealing ring at the upstream end of said valve being provided with a surface exposed to the bore through the body between the outer face of the respective seating ring and the respective flange, whereby fluid under pressure in said bore upstream of the ball applies force against said surface and increases the seal of the respective sealing ring against the respective flange and the walls of the respective counterbore.

2. A ball valve as defined in claim 1 wherein each of said sealing rings has a surface thereon exposed to the bore through the body between the outer face of the respective seating ring and the respective flange, whereby fluid under pressure in said bore upstream and downstream of the ball applies force against said surfaces and increases the seal of the sealing rings against the respective flanges and the walls of the respective body counterbores.

3. A ball valve as defined in claim 1 wherein the sealing ring at the upstream end of the valve has an annular groove in the outer face thereof facing the respective flange, whereby fluid under pressure in the bore of the body upstream of the ball will gain access to said groove and deform the respective sealing ring into tighter sealing engagement with the respective flange and the walls of the respective body counterbore.

4. A ball valve as defined in claim 1 wherein each of said sealing rings has an annular groove in the end thereof facing the respective flange, whereby fluid under pressure migrating between the outer face of either of said seating rings and the respective flange will enter the groove in the respective sealing ring and force the sealing ring against the respective flange and the walls of the respective counterbore.

5. A ball valve as defined in claim 4 wherein the portion of each sealing ring radially outward of the respective groove extends further outwardly of the respective seating ring outer face than does the portion thereof radially inward of the respective groove.

6. A ball valve as defined in claim 1 wherein each of said sealing rings has an annular bead formed integrally on the end thereof facing the respective flange positioned to be at least partially deformed by the respective flange.

7. A ball valve as defined in claim 6 wherein each of said sealing rings also has an annular bead on the outer periphery thereof positioned to be at least partially deformed by the walls of the respective body counterbore when the valve is assembled between said flanges.

8. A ball valve as defined in claim 1 wherein each of said sealing rings has an annular groove in the outer periphery thereof communicating with the outer end face of the respective seating ring, and the sealing ring for the respective seating ring is bonded in the respective seating ring groove.

9. A ball valve as defined in claim 1 wherein each sealing ring is bonded around the outer periphery of the respective seating ring.

10. A ball valve as defined in claim 1 wherein each sealing ring is bonded around the outer periphery of the respective seating ring and has an axial length greater than the depth of the respective counterbore in the relaxed condition of the respective sealing ring.

11. A ball valve for use between a pair of flanges, comprising:
a tubular body having an upstream end face and a downstream end face for contact by said flanges when the valve is assembled and having a counterbore in each end face thereof;
a valve stem extending through and journaled in one side of the body;
a ball member in the body having a port therethrough and loosely connected to the valve stem for movement of the ball member axially in the body when the ball member is turned to a closed position;
a pair of seating rings of high strength material each having an annular portion positioned in one of said counterbores, said portion having an axial thickness less than the axial depth of the respective counterbore whereby said seating rings may slide in said counterbore in an axial direction parallel to the direction of fluid flow through the valve, each of said seating rings having a frusto-spherical face shaped and positioned to slidingly mate with the ball member; and
an elastic material sealing ring bonded to each seating ring protruding radially outward from the respective seating ring to sealingly engage the walls of the respective body counterbore when the valve is assembled, each of said sealing rings also protruding in its relaxed, uncompressed state, beyond the respective body end face when the respective seating ring engages the axially inner end of the respective body counterbore to be deformed by the respective flange when the valve is assembled and resiliently urge the respective seating ring toward the axially inner end of the respective body counterbore, whereby the seating rings tend to follow and remain in contact with the ball as the ball moves axially in the body.

12. A ball valve as defined in claim 11 wherein the ball member and the body are sized such that the seating rings engage the ball member when in contact with the inner ends of said counterbores and when the ball member is centered in the body, whereby a seating ring will be disengaged from the ball member when the ball member moves from the center of the body toward the opposite end of the body.

13. A ball valve as defined in claim 12 wherein each seating ring has a circumferential shoulder thereon slidingly fitting in the body when the valve is assembled to retain the respective seating ring centered with respect to the ball member.

14. A ball valve assembly, comprising:
a tubular body having an upstream end face and a downstream end face and having a counterbore in each end face thereof forming outwardly facing upstream and downstream shoulders;
a pair of pipe flanges;
a plurality of bolts spaced in circumferentially spaced relation around and radially outwardly of the body and engaging said flanges to hold said flanges against the opposite ends of the body;
a ball member having a port therethrough journaled in the body;
a pair of seating rings of high strength material each having an annular portion positioned in one of said counterbores, said seating rings having a frusto-spherical front face mating with the ball and an outer face, the distance between the outer faces of said two seating rings being less than the length of the body, the limit of axial displacement inwardly of the sealing rings being determined by the annular portions and the shoulders; and
an elastic material sealing ring bonded around each seating ring positioned to sealingly engage the respective flange and the walls of the respective body counterbore when the valve is assembled.

15. A ball valve assembly, comprising:
a tubular body having an upstream end face and a downstream end face and having a counterbore in each end face thereof;
a pair of pipe flanges;
a plurality of bolts spaced in circumferentially spaced relation around and radially outside the body and engaging said flanges to hold said flanges against the opposite ends of the body;
a valve stem extending through and journaled in one side of the body;
a ball member having a port therethrough and positioned in the body loosely connected to the valve stem for movement of the ball member axially in the body when the ball member is turned to a closed position;
a pair of seating rings of high strength material each having an annular portion positioned in one of said counterbores, said portion having an axial thickness less than the depth of the respective counterbore whereby said seating rings may slide in said counterbore in an axial direction parallel to the direction of fluid flow through the valve, each of said seating rings having a face shaped and positioned to slidingly mate with the ball member; and
an elastic material sealing ring bonded to each seating ring protruding radially outward from the respective seating ring to sealingly engage the walls of the respective body counterbore when the valve is assembled, each of said sealing rings also protruding beyond the respective body end face when the respective seating ring engages the inner end of the respective body counterbore to be deformed by the respective flange when the valve is assembled and resiliently urge the respective seating ring toward the inner end of the respective body counterbore, whereby the seating rings tend to follow and remain in contact with the ball as the ball moves axially in the body, until said portions of said seating rings contact a shoulder formed by the intersection of one of said counterbores with the bore through said tubular body.

16. A ball valve for use between a pair of flanges, comprising:

a body having an upstream end face and a downstream end face for contacting said flanges when the valve is assembled between the flanges and having a bore therethrough between said end faces forming a valve chamber in the body, said body also having a counterbore in said upstream end face concentric with said bore forming an outwardly facing upstream shoulder;

a ball positioned in the valve chamber having a port therethrough;

means for turning the ball between open and closed position;

a seating ring of high strength material having an annular portion positioned in said counterbore and having a frusto-spherical front face shaped to slidingly mate with the outer surface of the ball, and having an outer face engageable with the flange contacting the upstream end face of the body, said portion of the seating ring in said counterbore occupying less than the total axial depth of the counterbore; and an elastic material sealing ring adhered to the seating ring having an outer diameter, in the relaxed condition thereof, greater than the diameter of the counterbore and positioned to be compressed against the walls of the counterbore when the valve is assembled, said sealing ring in its relaxed condition, being extended outwardly of said upstream end face when the sealing ring is in sliding contact with the upstream end face of the body when the valve is assembled, whereby said sealing ring seals against the flange and the wall of said counterbore, and said portion of said seating ring is retained in contact with said outwardly facing upstream shoulder.

17. A ball valve as defined in claim 16 wherein the sealing ring is provided with a surface exposed to the bore through the body between the outer face and flange, whereby fluid under pressure in said bore upstream of the ball applies force against said surface and increases the seal of the sealing ring against the flange and the walls of the body counterbore.

References Cited

UNITED STATES PATENTS

| | | | |
|---|---|---|---|
| 2,751,185 | 6/1956 | Shand | 251—172 |
| 2,837,308 | 6/1958 | Shand | 251—315 |
| 2,949,325 | 8/1960 | Nenzell | 277—207 |
| 2,985,421 | 5/1961 | Anderson | 251—172 |
| 3,101,740 | 8/1963 | Ray | 251—315 |
| 3,151,837 | 10/1964 | Leek | 251—315 |
| 3,171,662 | 3/1965 | Warn | 277—235 |
| 3,182,952 | 5/1965 | Montesi | 251—315 |
| 3,266,769 | 8/1966 | Shand | 251—317 |

FOREIGN PATENTS

| | | |
|---|---|---|
| 1,018,974 | 10/1952 | France. |
| 1,072,917 | 3/1954 | France. |
| 619,659 | 10/1935 | Germany. |
| 843,149 | 8/1960 | Great Britain. |

M. CARY NELSON, *Primary Examiner.*

W. CLINE, *Assistant Examiner.*